United States Patent [19]

Dahlqvist et al.

[11] 3,931,468

[45] Jan. 6, 1976

[54] METHOD AND A DEVICE FOR GENERATING LINE RASTERS IN AN INFRA-RED IMAGING SYSTEM

[75] Inventors: Jan Dahlqvist, Akersberga; Bo Matsson, Marsta; Benny Johansson, Sollentuna, all of Sweden

[73] Assignee: AGA Aktiebolag, Lidingo, Sweden

[22] Filed: Mar. 5, 1974

[21] Appl. No.: 448,271

[30] Foreign Application Priority Data

Mar. 6, 1973 Sweden .............................. 7303076

[52] U.S. Cl. ...... 178/69.5 R; 178/69.5 TV; 178/6.8; 178/7.6
[51] Int. Cl.² .......................................... H04L 7/00
[58] Field of Search... 178/69.5 G, 69.5 TV, 69.5 F, 178/69.5 R, 7.6, 7.1, DIG. 8, 6, 6.8; 250/334, 234–236, 347, 348, 353; 350/7, 285, 6

[56] References Cited
UNITED STATES PATENTS

| | | |
|---|---|---|
| 3,328,523 | 6/1967 | Treseder et al. ..................... 178/7.6 |
| 3,617,106 | 11/1971 | Bjork ................................ 250/236 |
| 3,688,037 | 8/1972 | Ipri ............................. 178/69.5 TV |
| 3,691,297 | 9/1972 | Merrell et al. ................ 178/69.5 TV |
| 3,708,621 | 1/1973 | Yamamoto .................... 178/69.5 TV |
| 3,717,772 | 2/1973 | Engman .............................. 178/7.6 |
| 3,731,098 | 5/1973 | Hunt .................................. 178/7.6 |

*Primary Examiner*—Albert J. Mayer
*Attorney, Agent, or Firm*—Lerner, David, Littenberg & Samuel

[57] ABSTRACT

The present invention relates to a method and a device for generating line rasters in an infra-red imaging system (IR-imaging system) comprising an IR-camera and an image representation unit; the IR-camera being provided with a frame scanning unit comprising a frame trigger unit; and with the line scanning unit comprising a line trigger unit, and the line trigger frequency being determined by using the rotational speed of the line scanning unit as a reference signal for the rotational speed of the frame scanning unit.

4 Claims, 2 Drawing Figures

METHOD AND A DEVICE FOR GENERATING LINE RASTERS IN AN INFRA-RED IMAGING SYSTEM

BACKGROUND OF THE INVENTION

The line raster on the image in an IR-imaging system, said image being presented by means of the image representation unit and generally on a cathode-ray tube, can be built up of, for example, in two sweeps; one in a horizontal direction (line sweep) and one in a vertical direction (frame sweep). The sweep starts are obtained by trigger signals from an optical-mechanical scanning unit. The scanning may be carried out, for example, by two rotational movements, one horizontal and one vertical. The scanning element consists, for example, of rotating prisms of, for example, silicon, but scanning elements may be used which contain tilting mirrors and rotating reflecting drums. The present invention is applicable to most existing scanning systems, and in the example given in the following a system with rotating scanning units is described.

To obtain the best possible picture of the scanned object, a high scanning frequency is aimed at. The maximum scanning frequency is limited by the mechanical system, the scanning frequency being chosen highest for the horizontal movement. At one revolution of, for example, the line scanning unit the object is scanned a certain number of times depending on the action of the scanning unit. To obtain a good pictorial quality at the photographic recording of the image, high demands are made especially on the precision in the frame trigger system. In photographing it is desirable moreover to have a large number of lines per frame so that the line pattern should not have a disturbing effect on the image. This can be achieved by making use of a so-called interlacing process (sliding line raster), where an image is built up of a certain number of fields which are displaced in relation to one another. The interlacing process raises further the requirement for precision in the trigger system.

In the standard infra-red imaging systems the line trigger signal is produced by the line trigger unit and the frame trigger signal by the frame trigger unit. These trigger units are controlled by the respective scanning unit. As mentioned earlier, the rotational speed of the line scanning unit is greater than the rotational speed of the frame scanning unit, which implies that a relatively good precision can be obtained in the line trigger signal, whilst it is appreciably more difficult to obtain a good precision in the frame trigger signal owing to mechanical imperfections. Seen against this background it will be clear that the demand for precision in the frame trigger system is greater than the demand for precision in the line trigger system, whilst at the same time it is more difficult to achieve a high precision in the frame trigger system.

SUMMARY OF THE INVENTION

The present invention relates to a method and a device for producing a frame trigger signal of high precision by using a signal obtained from the line scanning unit as a reference signal for the rotational speed of the frame scanning unit with the frame scanning signal being operative to periodically reset the frame trigger signal.

The characteristics of the invention will be evident from the enclosed patent claims.

DETAILED DESCRIPTION OF THE DRAWINGS

Figure 1:
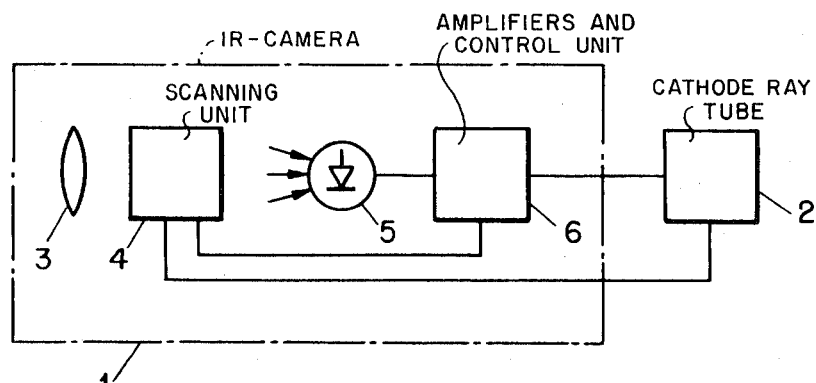
Figure 2:
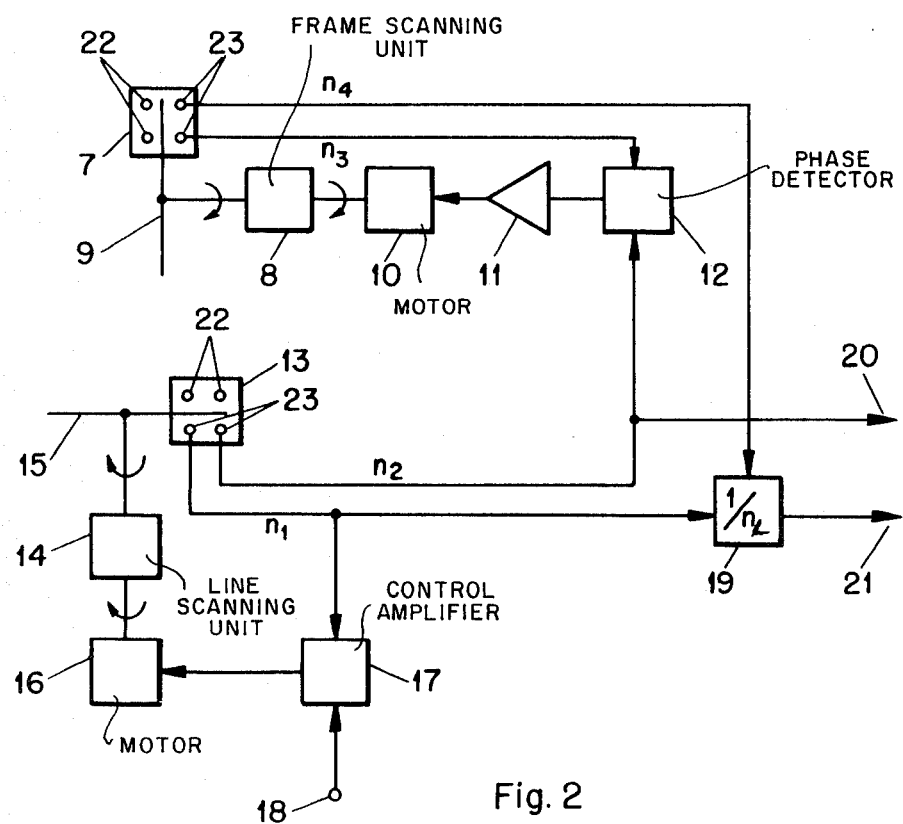

The invention will be described in detail with the help of the enclosed drawing, in which FIG. 1 schematically shows an infra-red imaging system, and FIG. 2 shows in block form a part of the system according to FIG. 1, this block diagram constituting only one example of an embodiment of a device according to the invention.

FIG. 1 shows schematically an infra-red imaging system consisting of an IR-camera 1 and an image representation unit 2 which for example may comprise a cathode-ray tube.

The IR-camera 1 comprises a lens system 3 and a scanning unit 4. Furthermore the IR-camera comprises an IR-detector 5 and various amplifiers and control units designated by the block 6. The block 6 is in connection with the scanning unit 4 and the image representation unit 2, the latter unit obtaining trigger signals from the scanning unit 4.

FIG. 2 shows a block diagram in respect of the scanning unit in FIG. 1. In the example according to FIG. 2 it is assumed that the scanning unit comprises two prisms rotating perpendicularly to one another. One prism scans the object in horizontal direction and is called a line scanning unit and is designated by the numeral 14. The other prism scans the object in a vertical direction and is called the frame scanning unit and is designated by the numeral 8. Each of these scanning units 8 and 14 is driven by its electric motor 10 and 16 respectively. In fixed connection with the frame scanning unit 8 is arranged a code disc 9 which is provided with a number of holes distributed over two channels. These channels are scanned by two light-producing elements 22, for example light emitting diodes, being arranged one over each channel, and by two light-sensitive elements 23, for example photo-cells, being arranged below each channel to receive light from the elements 22 when a hole passes in the code disc. These elements 22 and 23 are contained in a frame trigger unit 7.

In the same manner as described above in connection with the frame scanning unit, a code disc 15 is firmly attached to the line scanning unit which thus rotates at the same speed as the line scanning unit 14. The code disc 15 is provided with holes, distributed over two channels, which are scanned by a set of light emitting diodes and photo-cells 22 and 23 respectively arranged in a line trigger unit 13, as was described in connection with the frame trigger unit 7.

Numeral 18 designates a connection point for an outer line reference signal which is passed to a control amplifier 17 for the control of the motor 16 of the line scanning unit. To the control amplifier 17 are passed signals also from one of the channels in the line trigger unit 13. The motor 16 is controlled to keep a speed corresponding to the speed which is indicated by the outer line reference signal. From the second channel in the line trigger unit 13 a line trigger signal is generated which is fed to the image representation unit, illustrated in the figure by means of the arrow 20. The said line trigger signal is used also as a reference signal for the frame scanning unit 8 and is, therefore, also fed to a phase detector 12 which is connected via an amplifier 11 to the motor 10 which drives the frame scanning unit 8. The signal from one of the channels in the frame trigger unit 7 is fed to the phase detector 12. Said means form a control system for the control of the motor 10.

Normally a signal is passed from the second channel in the frame trigger unit 7 to the image representation unit so that the lastmentioned unit should obtain a frame trigger signal. In the device in accordance with the invention, however, use is made of the line trigger unit 13 for the issue of the frame trigger signal. This is brought about in that the signal which is used for the control of the motor 16 of the line trigger unit 14 is also passed to an electronic divider 19 in which it is divided to a suitable frequency. The arrow 21 in FIG. 2 symbolizes that this divided frame trigger signal is transmitted to the image representation unit. In this manner the higher precision of the signal from the line trigger unit is utilized for forming the frame trigger signal. The low-speed code disc 9 which controls the signals from the frame trigger unit 7 is thus used only as a control system for the control of the frame scanning unit, and the second channel is used for zero-setting of the electronic divider 19. This synchronizing signal (zero-setting) is issued once per revolution of the frame scanning unit, so that no higher demands for precision are required for this signal.

As mentioned previously, the frame trigger unit and the line trigger unit each have two channels. These have been marked in FIG. 2 with $n_1$, $n_2$, and $n_3$ and $n_4$. These designations also indicate the number of trigger signals per revolution of the respective code disc and hence per revolution of the respective scanning unit. Furthermore, in the line trigger unit the rotational speed of the code disc 15 is called $r_1$ and in the frame trigger unit the rotational speed of the code disc 9 is called $r_2$.

The line trigger frequency $f_L$ which is obtained from the channel $n_2$ of the line trigger unit 13 is determined by an outer reference signal, as mentioned earlier. The control amplifier 17 adjusts the speed of the scanning unit so that the feed-back speed signal from the channel $n_1$ corresponds to the rererence signal. The signal frequency $f_1$ of the channel $n_1$ in the line scanning unit becomes:
$$f_1 = n_1 \cdot r_1 \tag{1}$$

As described above, the trigger signals from channel $n_2$ of the line trigger unit constitute the reference for the rotational speed of the frame scanning unit. The phase detector 12 picks up and adjusts the frame scanning speed so that the frequencies of the trigger signals from the channels $n_2$ and $n_3$ become equal.

The signal frequency $f_2$ from the channel $n_2$ in the frame scanning unit can be expressed:
$$f_2 = n_2 \cdot r_1 \tag{2}$$

Correspondingly we obtain for channel $n_3$ and $n_4$:
$$f_3 = n_3 \cdot r_2 \tag{3}$$
$$f_4 = n_4 \cdot r_2 \tag{4}$$

If the code disc 9 belonging to the frame scanning unit 8 has pitch errors or is mounted out-of-centre, this will give rise to optical jitter formation in the IR-image (an object will apparently not keep still). Owing to the fact that the optical system has a certain limited resolution a certain jitter in the IR-image can be accepted. If the trigger pulses from the same code disc are used for the start of the frame sweep, the corresponding jitter will also be found in the line raster. In order to obtain a uniform line raster in the photographic recording of the IR-image, the demand for a grid which is as small as possible is greater than the corresponding demand for the optical image. This is due to the fact that the photographic equipment has a relatively high resolution.

In order to reduce the mechanical demands on the frame scanning unit the trigger signals for the frame sweep starts are not taken from the frame trigger unit but via an electronic divider from the line trigger unit, as mentioned before. The divider divides the trigger frequency from channel $n_1$ by the factor $n_L$ and since the line scanning frequency is higher than the frame scanning frequency the mechanical demand is then less.

From equations (1) and (2) follows:
$$n_1 \cdot f_2 = n_2 \cdot f_1 \tag{5}$$

It follows from FIG. 2 that the frequency on channel $n_2$ is the line trigger frequency. This gives
$$f_2 = f_L \tag{6}$$

Since the device described is assumed to have interlacing a distinction has to be made between the terms frame trigger frequency and field trigger frequency. The frame trigger signal which is fed from the electronic divider 19 to the image representation unit will have the frequency $f_F$, the field trigger frequency. From this follows directly:
$$f_1 = n_L \cdot f_F \tag{7}$$

From FIG. 2 it is evident moreover that the control system for the frame scanning unit brings about that
$$f_2 = f_3 \tag{8}$$

Equations (6) and (8) give
$$f_3 = f_L \tag{9}$$

The number of optical scannings per revolution of the scanning unit is designated $n_0$. From this follows:
$$f_L = n_0 \cdot r_1 \tag{10}$$

Equations (2), (6) and (10) give
$$n_0 = n_2 \tag{11}$$

The ratio between the rotational speeds of the two code discs should be equal to the ratio between line and frame trigger signals. Hence:
$$\frac{r_1}{r_2} = \frac{f_L}{f_F}$$

If the field trigger frequency is designated $f_F$ and the frame trigger frequency is designated $f_B$ and the interlacing number is designated $n_i$ we obtain
$$f_F = n_i \cdot f_B \tag{13}$$

Furthermore it will be easily understood that
$$f_L = n_L \cdot f_B \tag{14}$$

where thus $f_L$ is the line trigger frequency, $f_B$ is the frame trigger frequency and $n_L$ is the number of lines, that is the number of lines per frame.

In order for the mechanical scanning to be synchronized (in phase) with the electronic triggering, the trigger signal from channel $n_4$ sets the computer to zero once per revolution of the frame scanning unit.

Since only one trigger signal per revolution is made use of on channel $n_4$, there is no demand with regard to centering and pitch of the code disc insofar as this channel is concerned.

In connection with the embodiment according to the drawing, a dimensioning example shall be given here.

In this dimensioning example it is assumed that the interlacing number $n_i = 4$; the line number $n_L$ - 401 and that the number of optical scannings per revolution of the scanning unit $n_0 = 8$. Furthermore, in accordance with what was just mentioned, the electronic divider is set to zero once per revolution of the frame scanning unit, so that we obtain $n_4 = 1$. The field frequency is chosen to be $f_F = 25$ Hz, which is approximately the lowest frequency possible without obtaining a flicker effect in the image. On the basis of these given quantities we are now looking for the rotational speeds $r_1$ and $r_2$ of the two code discs.

Equations (10), (13) and (14) with the above values entered become:

$$r_1 = \frac{n_L \cdot f_F}{n_0 \cdot n_i} = 313 \frac{9}{32} \text{rev/s} \qquad (15)$$

Equations (12), (13) and (14) with the above values entered become:

$$r_2 = \frac{r_L \cdot n_i}{n_L} = 3 \frac{1}{8} \text{rev/s} \qquad (16)$$

From equation (16) we obtain the speed ratio:

$$\frac{r_1}{r_2} = \frac{n_L}{n_i} = 100 \frac{1}{4}$$

It was mentioned earlier that the method and the device in accordance with the invention is especially suitable to be used in photographing of the image on the IR-representation unit.

This camera can then be connected in such a manner to the IR-system that on pressing the shutter the image on the representation unit is first extinguished whereupon the shutter of the camera is opened. As soon as this has happened the image is lit for exposure of the film at a pulse from the zero-setting signal to the electronic divider included in the system. At the subsequent zero-setting signal the image is extinguished whereupon the shutter is closed.

In this way a complete and exact exposure of the image is obtained without having to depend on the exactness of the shutter.

Although this invention has been described with respect to its preferred embodiments, it should be understood that many variations and modifications will now be obvious to those skilled in the art and it is preferred, therefore, that the scope of the invention be limited, not by the specific disclosure herein, only by the appended claims.

What is claimed is:

1. A device for the generation of a signal to synchronize a frame sweep with a mechanical frame scanning device comprising a line scanning device responsive to a reference signal to maintain a speed in accordance therewith, said line scanning device producing a line synchronizing signal in accordance with the speed thereof, a frame scanning device responsive to said line synchronizing signal to control the speed thereof, said frame scanning device producing a frame speed signal responsive to the speed of said frame scanning device, and frequency dividing means responsive to said line scanning device, and periodically reset by said frame speed signal, for providing a frame synchronizing signal.

2. A device in accordance with claim 1, including an image representation unit responsive to said frame synchronizing signal and said line synchronizing signal.

3. A device in accordance with claim 1 wherein said line scanning device produces a line speed signal responsive to the speed thereof, said divider receiving as an input said line speed signal.

4. A device in accordance with claim 1 wherein said line scanning device includes a rotational disc, sensing means for sensing rotational speed of said disc, said sensing means producing said line synchronizing signal.

* * * * *